Patented Feb. 9, 1932

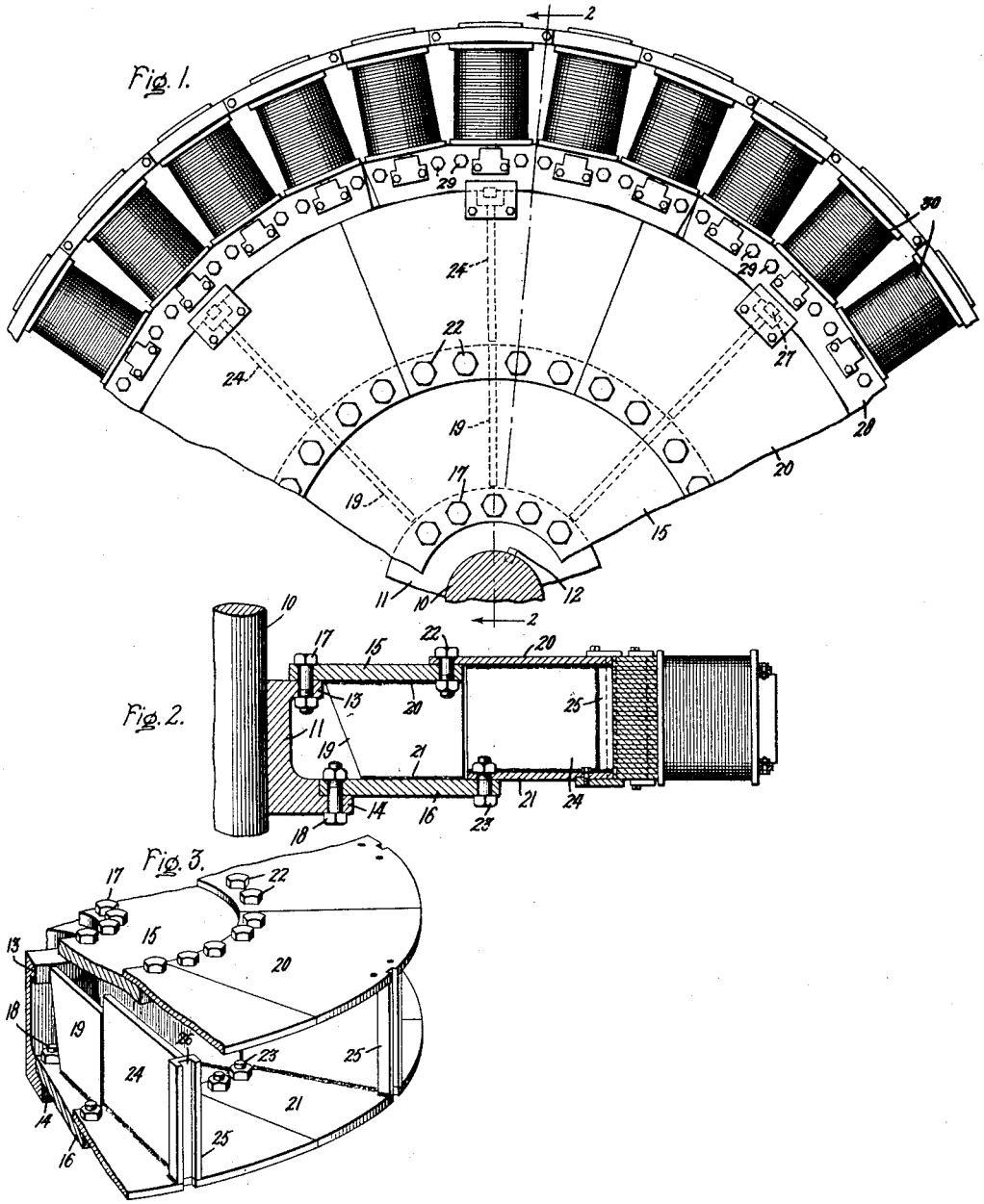

1,844,710

UNITED STATES PATENT OFFICE

ALEXANDER P. WOOD, OF SCHENECTADY, NEW YORK, ASSIGNOR TO GENERAL ELECTRIC COMPANY, A CORPORATION OF NEW YORK

FABRICATED STRUCTURE FOR DYNAMO ELECTRIC MACHINES

Application filed November 21, 1929. Serial No. 408,876.

My invention relates to fabricated structures for dynamo electric machines.

In fabricating rotor spiders or bearing brackets for dynamo electric machines of large size, it is not satisfactory to build them up directly from plates of such size as to extend over the entire diameter of the spider or bracket. In the first place, plates of this size are not readily available, and if they were, the distribution of the material in the completed spider or bracket would not be such as to utilize the same most effectively for resisting the stresses to which the structure is subjected. On the other hand, it has heretofore been an expensive operation to construct spiders and bearing brackets of small plates and fasten them together, because it is ordinarily required that the parts which are fitted together be accurately alined or that the surfaces which are fitted together be machined.

The object of my invention is to provide an improved fabricated structure for dynamo electric machines such that extreme accuracy in fabricating the parts or machining of the parts which are attached together, is unnecessary. The structure by which I accomplish this includes a central supporting structure having axially spaced plates attached thereto, a plurality of segmental plates attached to said axially spaced plates and other plates welded to the segmental plates for reinforcing the structure.

My invention will be more fully set forth in the following description referring to the accompanying drawings, and the features which characterize my invention will be pointed out with particularity in the claims annexed to and forming a part of this specification.

In the drawings Fig. 1 is a fragmentary elevation of a rotor of a dynamo electric machine embodying my invention; Fig. 2 is a section approximately on the line 2—2 of Fig. 1, and Fig. 3 is a fragmentary perspective view of the rotor construction shown in Figs. 1 and 2 partly broken away.

Referring to the drawings for convenience in illustration, I have shown my improved fabricated construction for dynamo electric machines as applied to the rotor of such machines. This rotor includes a supporting shaft 10 having a central supporting structure mounted thereon including a hub 11 which is keyed thereto as indicated at 12. The hub includes two axially spaced radially extending flanges 13 and 14, the flange 14 being of somewhat larger diameter than the flange 13. This central supporting structure also includes disks 15 and 16 having central openings therein and bolted to the flanges 13 and 14 at 17 and 18 respectively. The disks 15 and 16 are reinforced by radially extending plates 19 which are welded to the plates 15 and 16 at 20 and 21. The inside diameter of the central opening in the plate 16 is larger than the outside diameter of the flange 13 on the hub so that when the bolts 17 and 18 are removed the unitary structure including the disks 15 and 16 and the plates 19 can be removed axially from the hub. In order to obtain a rotor of large diameter which can be conveniently fabricated, I bolt a plurality of segmental plates 20 and 21 to the outer periphery of the disks 15 and 16 respectively, as indicated at 22 and 23. The plates 20 and 21 being nearer the outer periphery of the rotor are not subject to as great bending stresses as the plates 15 and 16 so that they can be made of thinner material and thereby effect considerable economy in the material required in the rotor. The outside diameter of the disk 16 is made of larger diameter than the outside diameter of the disk 15 and the segmental plate 20 is made longer than the segmental plate 21 so that when the segmental plates are bolted to the disks 15 and 16 of the central supporting structure, the outer ends of the segmental plates 20 and 21 are of the same diameter. The segmental plates 20 and 21 can be readily removed from disks 15 and 16 by removing the bolts 22 and 23. The segmental plates 20 and 21 are reinforced by radially extending plates 24 which are welded thereto and which are preferably arranged in radial alinement with the plates 19. The outer ends of the plates 24 terminate inside of the outer periphery of the segmental plates 20 and 21 so as to permit reinforcing blocks 25 to be attached to the radial plates and to the segmental plates to reinforce the structure. These blocks are slotted, as indicated at 26, to receive keys 27 for supporting a magnetic structure on the rotor including overlapping plates 28 which are bolted together, as indicated at 29, and provided with dovetail slots in which pole pieces 30 are secured.

It will be observed that by fabricating the rotor in accordance with my invention that the steel plates constituting the structure can be varied in thickness as required to withstand the stresses to which they are subjected, and thereby utilize the steel plates most effectively in the construction. This is not possible where the entire construction is fabricated directly from unitary steel plates.

In fabricated structures of the type which I have described, it has been necessary heretofore to accurately build or finish the parts of the rotor structure so that they could be fitted together. In fabricating these structures, therefore, I do not accurately finish the parts, but first fasten them together and aline them in the relation desired in the completed structure and then weld or otherwise attach reinforcing plates thereto. I am thereby enabled to effect considerable economy in the manufacture of the structure. In constructing the rotor I have described, disks 15 and 16 of the rotor are first bolted to the flanges 13 and 14 of the hub 11. It is not important to accurately finish the surfaces of the flanges 13 and 14 and the disks are merely secured directly thereto and permitted to conform to any slight irregularity in the shape of the flanges. I then aline the disks 15 and 16 substantially radially of the hub 11 in any convenient manner and weld radially extending plates 19 to the disks 15 and 16. Upon the completion of the unitary structure the disks 15 and 16 and radially extending plates 19 can be removed from the hub member by taking out the bolts 17 and 18, and if replaced in the same position there will be no difficulty in fitting the flanges 13 and 14 to the disks 15 and 16, as each conforms to any irregularities in the other. In fabricating the portion of the structure connecting the disks 15 and 16 and the field structure, I bolt the segmental plates 20 and 21 to the disks 15 and 16, as indicated at 22 and 23, aline the segmental plates 20 and 21 radially of the rotor structure as desired, and while retaining them in this position, weld radially extending plates 24 and blocks 25 thereto to complete the structure. It will be noted that upon removal of the bolts 22 and 23 that the segmental plates 20 and 21 can readily be removed, and that the plates will conform to any irregularity in the disks 15 and 16, when they are again bolted thereto because they are initially fabricated to conform to them.

Although I have disclosed my improved fabricated structure as applied to the rotor of a dynamo electric machine, I do not desire my invention to be limited thereto, and I intend in the appended claims to cover all modifications which do not depart from the spirit and scope of my invention.

What I claim as new and desire to secure by Letters Patent of the United States is:—

1. A fabricated structure for dynamo-electric machines including two disks, means for securing said disks together in axially spaced relation including radial plates welded thereto, a plurality of segmental plates attached to the periphery of said disks, and radial plates welded to said segmental plates.

2. A fabricated rotor for dynamo-electric machines including two disks, means for securing said disks together in axially spaced relation including radially arranged plates welded thereto, a plurality of segmental plates attached to the periphery of said disks, and radial plates welded to said segmental plates.

3. A fabricated rotor for dynamo-electric machines including two disks, means for securing said disks together in axially spaced relation including radially arranged plates welded thereto, a plurality of segmental plates attached to the periphery of said disks, radial plates welded to said segmental plates, and a magnetic structure carried by said segmental plates.

In witness whereof, I have hereunto set my hand this 20th day of November, 1929.

ALEXANDER P. WOOD.